United States Patent [19]

Belmonte et al.

[11] 4,353,391

[45] Oct. 12, 1982

[54] RADIOACTIVE MATERIALS SHIPPING CASK ANTICONTAMINATION ENCLOSURE

[75] Inventors: Mark S. Belmonte, Irwin; James H. Davis; David A. Williams, both of Pittsburgh, all of Pa.

[73] Assignee: The United States of America as represented by the United States Department of Energy, Washington, D.C.

[21] Appl. No.: 293,911

[22] Filed: Aug. 18, 1981

[51] Int. Cl.[3] ...................... F16K 23/00; F16K 24/00

[52] U.S. Cl. .................................. 137/565; 137/587; 137/312; 220/449; 250/506.1; 376/272

[58] Field of Search ...................... 137/312, 587, 565; 220/429, 449; 206/205, 524.8; 414/146, 290; 376/272; 250/506, 519

[56] References Cited

U.S. PATENT DOCUMENTS

| | | | |
|---|---|---|---|
| 1,121,388 | 12/1914 | Milks . | |
| 3,101,839 | 8/1963 | Holman | 220/429 |
| 3,180,384 | 4/1965 | Seifert | 150/1 |
| 3,211,144 | 10/1965 | Nehring | 128/214 |
| 3,322,141 | 5/1967 | Gans, Jr. et al. | 137/512 |
| 3,573,462 | 4/1971 | Wilkins et al. | 250/108 |
| 3,999,653 | 12/1976 | Haigh et al. | 220/449 |
| 4,109,822 | 8/1978 | Egli | 220/404 |
| 4,222,889 | 9/1980 | Uerpmann | 252/301.1 |
| 4,229,316 | 10/1980 | Baatz et al. | 250/506 |

FOREIGN PATENT DOCUMENTS

| | | | |
|---|---|---|---|
| 35383 | 7/1922 | Norway | 220/429 |

*Primary Examiner*—Martin P. Schwadron
*Assistant Examiner*—John A. Rivell
*Attorney, Agent, or Firm*—Michael F. Esposito; Richard G. Besha; James E. Denny

[57] ABSTRACT

An anticontamination device for use in storing shipping casks for radioactive materials comprising (1) a seal plate assembly; (2) a double-layer plastic bag; and (3) a water management system or means for water management.

9 Claims, 1 Drawing Figure

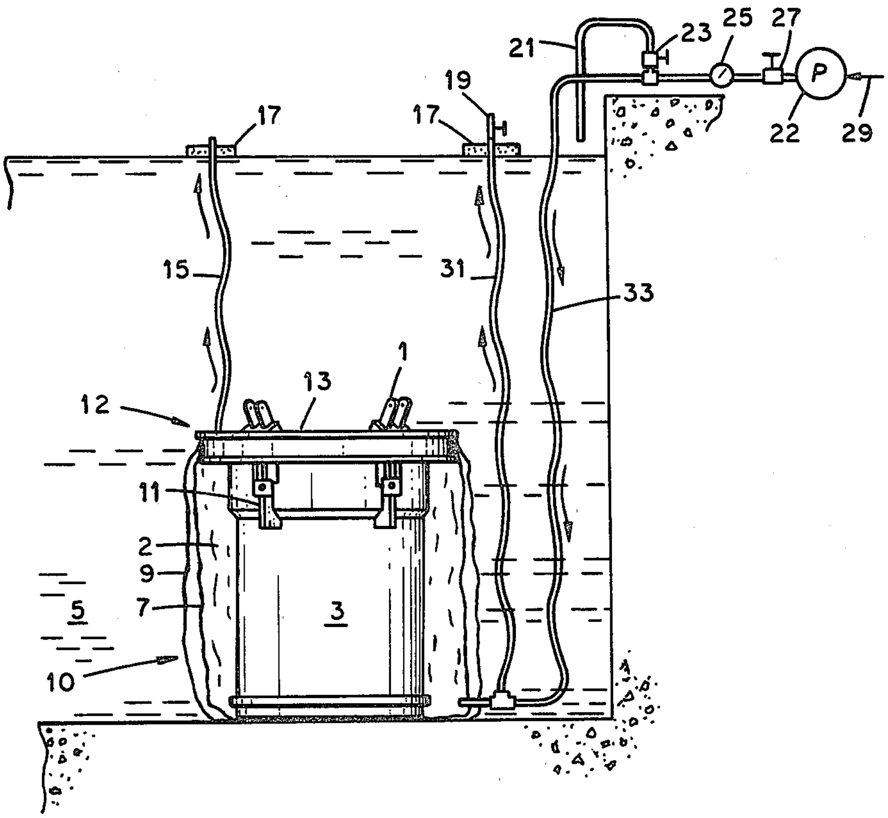
21
23
25
27
P
22
29
19
17
17
15
31
33
1
13
12
11
2
9
7
5
3
10

RADIOACTIVE MATERIALS SHIPPING CASK ANTICONTAMINATION ENCLOSURE

The U.S. Government has rights in this invention pursuant to contract No. DE-AC11-76PN00014 between the U.S. Department of Energy and Westinghouse Electric Corporation.

This invention is directed to a shipping cask anticontamination enclosure. In particular, the present invention is directed to a shipping cask anticontamination enclosure which enables a shipping cask to be transported into and from a radioactive contaminated water pit without contaminating the external surfaces of the cask.

Shipping casks for radioactive material are generally stored in water pits which are radioactively contaminated. Obviously, the external surfaces of these casks become contaminated during storage. This radioactive contamination must be removed prior to any transfer of the casks from the water pits. It has long been an object of the prior art to design systems which would minimize the decontamination procedures required for these shipping casks. Two known systems of decontamination are: (1) using an easily removable paint on the exterior of the shipping casks, and (2) using a bag to enclose the shipping cask to protect the external surface against wetting by radioactive contaminated water.

In the first technique, the cask is painted with strippable paint prior to submergence into the contaminated water. Upon removal of the casks from the water, the paint is removed from the container. Any radioactive contamination is removed from the cask with the stripped paint. This procedure is still in the experimental stage but suffers from the obvious drawbacks of (1) requiring the cask to be painted prior to each use, and (2) the paint does not always strip off easily. These disadvantages add to the number of hours needed to prepare each cask increasing the total cost of decontamination. The second procedure is only effective if the protective bag placed about the cask remains intact. If the bag ruptures, nothing would prevent the cask from being contaminated by the radioactive water. Accordingly, the development of an anticontamination device which can substantially overcome these prior art problems, and provides an economical and safe device, capable of minimizing exterior radioactive contamination of shipping casks remains a problem.

SUMMARY OF THE INVENTION

It is the primary object of the present invention to provide an anticontamination device capable of providing protection for shipping casks used to transport radioactive material.

It is another object of the present invention to provide an anticontamination device capable of minimizing external radioactive contamination of shipping casks stored in radioactively contaminated water.

Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purpose of the present invention as embodied and broadly described herein, the anticontamination device of the present invention comprises a seal plate assembly; a double layered plastic bag supported by, and connected to the assembly; and a means for water management connected to the bag and assembly. The inner plastic bag is intended to provide the watertight feature of the bag assembly, the outer bag the strength required to resist the inner pressure. The seal plate assembly comprises an upper plate provided with a means for venting water, and at least one means for attaching the upper plate to a lifting means capable of removing the upper plate from the bag. The double-layered plastic bag comprises an inner and outer plastic bag. The inner bag may comprise a plastic such as polyvinylchloride. The outer bag may comprise a reinforced plastic such as reinforced polyvinylchloride. In addition, the inner bag of the double layered plastic bag is provided with a means for connecting the bag to the means for water management. The means for water management includes means for connecting a source of clean water to the plastic bag, means for measuring the flow of clean water from a clean water source to the bag, means for controlling the rate of flow of the clean water to the bag, and means to supply the clean water to the bag.

In a preferred embodiment of the present invention, the outer bag of the double layered bag includes a nylon reinforced polyvinylchloride.

In a further preferred embodiment of the present invention the upper plate of the seal plate assembly is selected to include an annular plate.

In a still further preferred embodiment of the present invention the means for venting water from the bag and the means for connecting the bag to the means for water management includes flexible tubing.

In another preferred embodiment of the present invention, the means for measuring the flow of clean water into the bag includes a flow meter.

In still another preferred embodiment of the present invention, the means for controlling the rate of flow of clean water to the bag includes adjusting valves.

In an additional preferred embodiment of the present invention the means for supplying clean water to said bag includes a pump. In an additional preferred embodiment of the present invention, a means for venting air or water from between the inner and outer bags is included.

The anticontamination device of the present invention is a substantial improvement over the above described prior art devices. In operation, the device of the present invention uses water pressure as the means of insuring that the external surface of the shipping cask remains uncontaminated. The water pressure in the bag is adjusted to insure that the pressure inside the bag is greater than, or equal to, the pressure outside the bag. Preferably, the water pressure inside the bag is slightly greater than the pressure outside the bag. Accordingly, should the bag rupture, there will be no leakage of radioactively contaminated water into the bag because the inside water pressure is greater than the outside water pressure. This pressure differential will only permit clean water to flow out of the bag into the storage pit. Therefore, the external surfaces of the shipping cask will remain uncontaminated.

The accompanying drawing which is incorporated in and forms a part of the specification is a cross-sectional view of a preferred embodiment of the apparatus of the present invention.

DETAILED DESCRIPTION OF THE INVENTION

With reference to the accompanying drawing, a detailed description of the anticontamination device of the present invention is set forth.

Shipping cask 3 containing radioactive material is placed within double layered plastic bag 10. Plastic bag 10 comprises an inner plastic bag 7 and an outer reinforced plastic bag 9. Inner and outer bags 7 and 9, respectively, may comprise conventional plastic sheet materials such as polyvinylchloride. Suitable reinforced plastic sheet material may include fibre reinforced polyvinylchloride sheet. Reinforcement may be any fibrous material to which the plastic sheet can be bonded, such as nylon, polyester, or metal fibres.

A seal plate assembly 12 comprising upper plate 13 is attached and sealed to bag 10. In the embodiment shown in the accompanying drawing plate 13 has been adapted to have four sets of lifting links 1. Lifting links 1 are provided with lifting lugs 11 which are attached to cask 3. These lugs 11 facilitate the simultaneous removal of cask 3 and device 2 from water pit 5. Plate 13 is also provided with a vent overflow line 15 maintained above the level of water in pit 5 by buoy 17. Line 15 may comprise a flexible tubing including conventional material such as rubber or plastic. Lifting links 1 are utilized to attach a lifting means (not shown) to the device 2 which enables removal of the device 2 and cask 3 from pit 5. It should be understood that links 1 are merely illustrative of a means for attaching plate 13 to the lifting mechanism, and are not intended to preclude other suitable devices.

While maintaining the open end of bag 10 in continuous contact with the perimeter of seal plate assembly 12, upper plate 13 of assembly 12 is secured to cask 3 forming a water tight seal. Bag 10 is provided with flexible tubing means 33 for connecting bag 10 to water management means (system) including adjusting valves 23 and 27, flow meter 25, pump means 22, and clean water supply 29. Tubing 33 may comprise any suitable material such as described above with reference to line 15.

In a preferred embodiment of the device of the present invention flexible tubing 33 may be modified to include inlet vent line 31 and inlet relief line 21. Vent line 31 and relief line 21 are utilized to prevent overpressurizing of bag 10. Buoys 17 maintain vent line 31 and valve 19 above the surface of the water in pit 5.

During operation, clean water from water supply 29 is pumped through inlet line 33 through valves 27 and 23 and flow meter 25 into bag 10. Valves 23 and 27, and flow meter 25 are conventional devices, and are utilized, without any modifications, to control and measure the flow of water. The clean water circulates through bag 10, and vents from bag 10 via vent overflow line 15 supported by buoy 17. The pressure inside bag 10 is maintained at a pressure greater than or equal to the water pit pressure by supporting vent overflow line 15 above the surface of the water in pit 5. For example, if line 15 is maintained two inches above the surface of the water in pit 5, the difference in the water pressure in bag 10 and the water pit pressure would be 2 inches. The circulation of the water about the annulus between casks 3 and bag 10 provides an uncontaminated water supply about cask 3 minimizing contamination of the external surface of the cask. In addition, because the pressure in bag 10 is greater than or equal to the pressure in the water pit, any accidental rupture of bag 10 would only cause clean water to flow out of the bag. Contaminated water from pit 5 would be prevented from flowing into bag 10 because of the differential water pressure.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An anticontamination device comprising:

(a) a seal plate assembly, (b) a double layered plastic bag supported by, and connected to, said seal plate assembly, and (c) a means for water management connected to said bag and assembly;

said seal plate assembly comprising an upper plate provided with a means for venting water and at least one means for attaching said upper plate to a lifting means capable of removing said upper plate from said bag; said double layered plastic bag comprising an inner plastic bag and an outer plastic bag including a reinforced plastic material, said inner bag being provided with a means for connecting said bag to said water management means; said means for water management including connecting means to connect a supply of clean water to said double layered bag, means for measuring the flow of clean water from said clean water supply to said bag, means for controlling the rate of flow of clean water to said bag, and means to supply said clean water to said bag.

2. The device of claim 1 wherein said upper plate of said seal plate assembly is selected to include an annular plate.

3. The device of claim 1 wherein said outer bag of said double layered plastic bag includes nylon reinforced polyvinylchloride.

4. The device of claim 1 wherein said means for venting water provided in said upper plate includes a flexible venting tube.

5. The device of claim 1 wherein said connecting means used to connect said bag and said clean water supply includes flexible tubing.

6. The device of claim 1 wherein said means for measuring the flow of clean water from said clean water supply to said bag includes a flow meter.

7. The device of claim 1 wherein said means for controlling the rate of flow of clean water to said bag includes adjustable valves.

8. The device of claim 1 wherein said means to supply clean water to said bag includes a pump.

9. The device of claim 1 wherein said means for venting water provided on said upper plate is maintained in a position whereby the water pressure inside the bag is equal to or greater than the water pressure outside the bag.

* * * * *